Jan. 28, 1930.  A. H. S. COVENTRY  1,745,009
CULTIVATOR
Filed Sept. 20, 1926
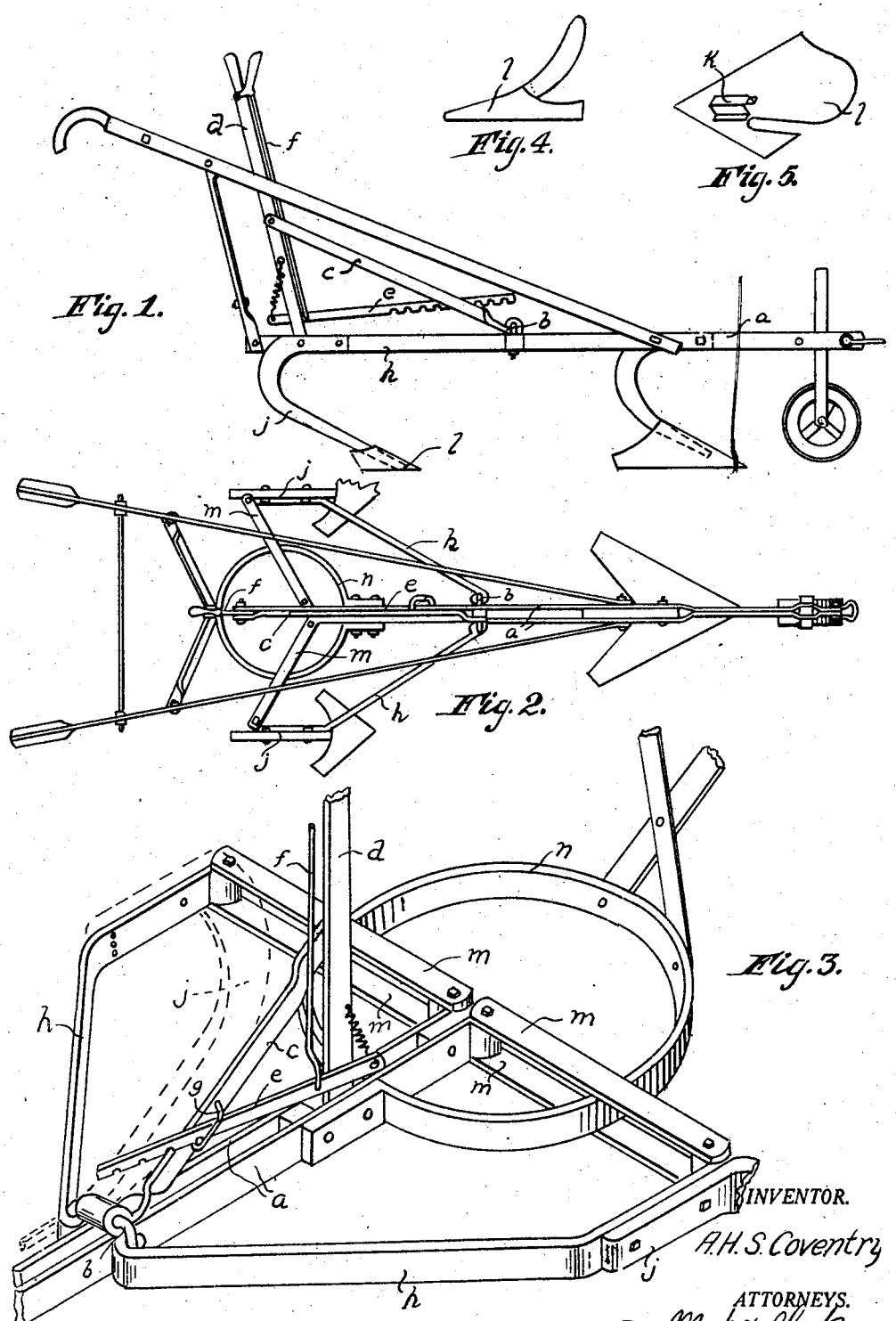
INVENTOR.
A.H.S. Coventry
ATTORNEYS.
By: Marks & Clerk Patented Jan. 28, 1930

1,745,009

UNITED STATES PATENT OFFICE

ALICK HERBERT STEPHEN COVENTRY, OF PIETERMARITZBURG, NATAL, SOUTH AFRICA

CULTIVATOR

Application filed September 20, 1926, Serial No. 136,666, and in the Union of South Africa June 18, 1926.

This invention relates to a new or improved agricultural implement and has for its object to provide a cultivator the distance between whose cutting members, tines, shares or the like shall be capable of adjustment to suit the row or rows to be worked.

In accordance with my invention I provide a cultivator having a plurality of members in the form of radial arms pivotally connected to the rear end of the cultivator beam and adapted to travel on a circular guide forming an integral part of the frame of the cultivator. At the free or outer ends of the said radial arms and pivotally mounted thereon I provide longitudinal members on which I mount brackets of suitable shape and construction having tapered ends which engage with sockets or slots formed on the underside of the tines, thereby eliminating the necessity for bolts and nuts or like fastenings.

The said longitudinal members are pivotally connected at their forward end to a collar encircling the cultivator beam and slidably mounted thereon. The said collar in turn is connected by means of an oblique member to the usual upright type of control hand lever and the position of the tines is maintained by a locking device consisting of a slotted bar engaging with a projection on the oblique member and operated from the hand lever handle by means of the usual spring handle and rod.

In order that my invention may be readily understood and carried into effect, reference is hereby made to the accompanying sheet of drawings which show by way of example a convenient embodiment of my invention and wherein—

Fig. 1 is an elevation of the cultivator,
Fig. 2 is a plan thereof,
Fig. 3 is an isometric view of the invention,
Fig. 4 is an alternative form of share, and
Fig. 5 is the reverse side of the same showing the shoe or recess formed in the share for the reception of the bracket ends.

Referring to these drawings wherein like letters of reference indicate corresponding parts wherever occurring throughout all the figures $a$ designates the cultivator beam encircling which and sliding thereon is a collar $b$ having attached to it an oblique member $c$ the other end which is attached to and operated by the lever $d$ the foot of which is bolted to and hinges in the cultivator beam $a$.

At the foot of the hand lever $d$ is the spring controlled locking bar $e$ operated by the lifting rod $f$ and whose notches engage as desired on the tooth $g$ which is secured to the oblique member $c$. Also attached to the collar $b$ are two longitudinal members $h$ to which are bolted curved brackets $j$ which are adjustable in relation to the members $h$ and whose lower extremities are squared to fit the shoe or recess $k$ on the cutting members, tines or shares $l$. At the rear end of the longitudinal members $h$ are pivotally connected the upper and lower radial arms $m$ which slide in pairs over and under a circular guide $n$ which is bolted to the cultivator beam $a$ and forms an integral part of the cultivator frame.

In operation the cultivator is employed in the ordinary way and when, by reason of the difference in width between rows, often found in different classes of crops, it is necessary to change the position of the cutting members, tines or shares, the operator grasps the handle of the lever $d$ and by compression lifts the rod $f$ thereby disengaging the locking bar $e$ from the tooth $g$.

The lever $d$ is now free to move forward or backward as desired until again locked by releasing the hand which drops the rod $f$ and with it the locking bar $e$.

The action of moving the lever $d$ causes forward or rearward motion in the collar $b$ through the medium of the oblique member $c$.

This forward or rearward motion of $b$ is transmitted to the longitudinal members $h$ and by means of the radial arms $m$ it becomes lateral or side motion as well.

As the brackets $j$ carrying the cutting members, tines, or shares $l$ are situated at the extremity of the radial arms $m$, it will be seen that any movement of the lever $d$ results in lateral or side motion to them.

Thus by a single forward or rearward movement of the lever $d$ the width between the cutting members, tines, or shares $l$ may be increased or reduced at will.

What I claim is:

1. A cultivator structure, including a beam, a plurality of arms pivotally connected adjacent the rear extremity of said beams, tines carried by said arms, a circular guide movably supporting said arms for pivotal movement, and means for actuating said arms, said actuating means including longitudinal members slidably mounted on the beam in advance of said arms.

2. A cultivator structure, including a beam, arms pivotally connected thereto, a circular guide supporting the arms for pivotal movement, tines carried by the arms, a means for actuating the radial arms carrying the tines including longitudinal members pivotally connected at their forward ends to a collar encircling the beam and slidably mounted thereon and at their rear ends to the outer extremities of the radial arms, the collar in turn being connected by an oblique member to an upright type of control hand lever provided with a locking device.

3. A cultivator as set forth in claim 2 wherein the locking device consists of a slotted bar pivotally secured to the hand lever and adjustably connected with the oblique member which in turn is secured to the sliding collar.

4. A cultivator as set forth in claim 1 characterized in that the radial arms are formed in pairs over and under the circular guide.

5. A cultivator as set forth in claim 1 characterized in that the circular guide forms an integral part of the cultivator frame.

In testimony whereof, I have signed my name to this specification at Mason's Mill, Pietermaritzburg, this 3rd day of August, 1926.

ALICK HERBERT STEPHEN COVENTRY.